R. ANNIGONI.
CIGAR MACHINE.
APPLICATION FILED JUNE 22, 1908.

913,869.

Patented Mar. 2, 1909.

WITNESSES
Albert S. Thayer
Florence E. Wolf

INVENTOR
Ricciardo Annigoni
BY
Duncan & Duncan
ATTORNEYS

UNITED STATES PATENT OFFICE.

RICCIARDO ANNIGONI, OF ASTORIA, NEW YORK, ASSIGNOR TO PROSPERO DE NOBILI, OF SPEZIA, ITALY, AS GENERAL PARTNER OF PROSPERO DE NOBILI & CO., A LIMITED PARTNERSHIP, OF LONG ISLAND CITY, NEW YORK.

CIGAR-MACHINE.

No. 913,869.  Specification of Letters Patent.  Patented March 2, 1909.

Application filed June 22, 1908. Serial No. 439,689.

*To all whom it may concern:*

Be it known that I, RICCIARDO ANNIGONI, a subject of the King of Italy, and resident of Astoria, county of Queens, and State of New York, have made certain new and useful Inventions Relating to Cigar-Machines, of which the following is a specification, taken in connection with the accompanying drawings.

This invention relates to cigar machines and relates especially to power-operated cigar machines of the rolling table and apron type.

Figure 1:
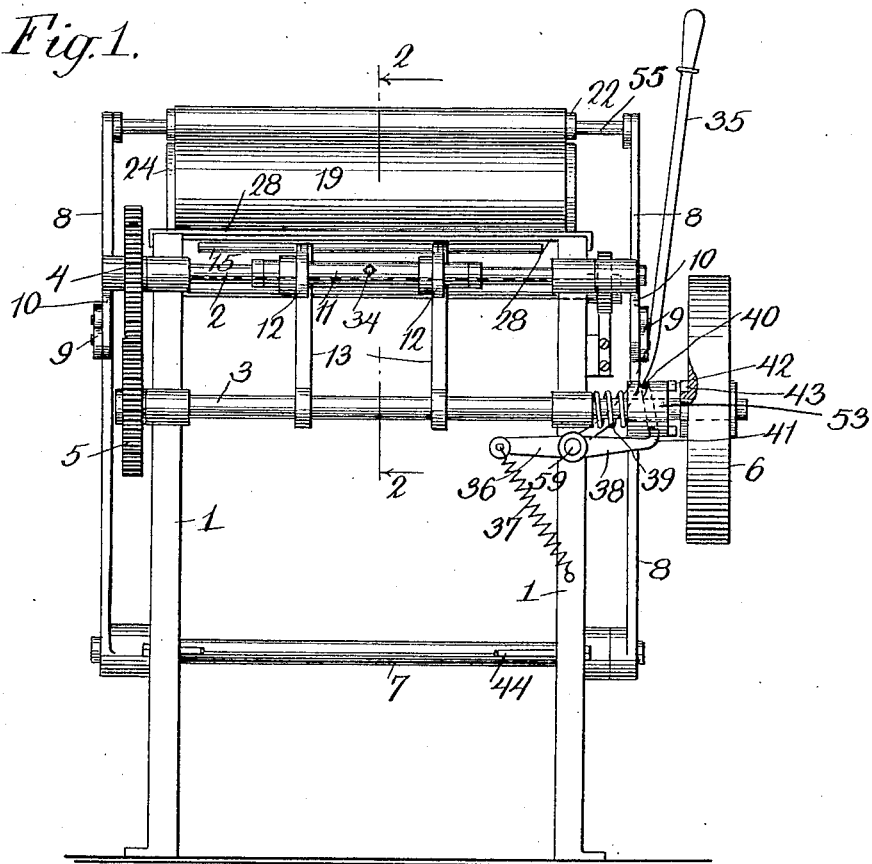
Figure 2:
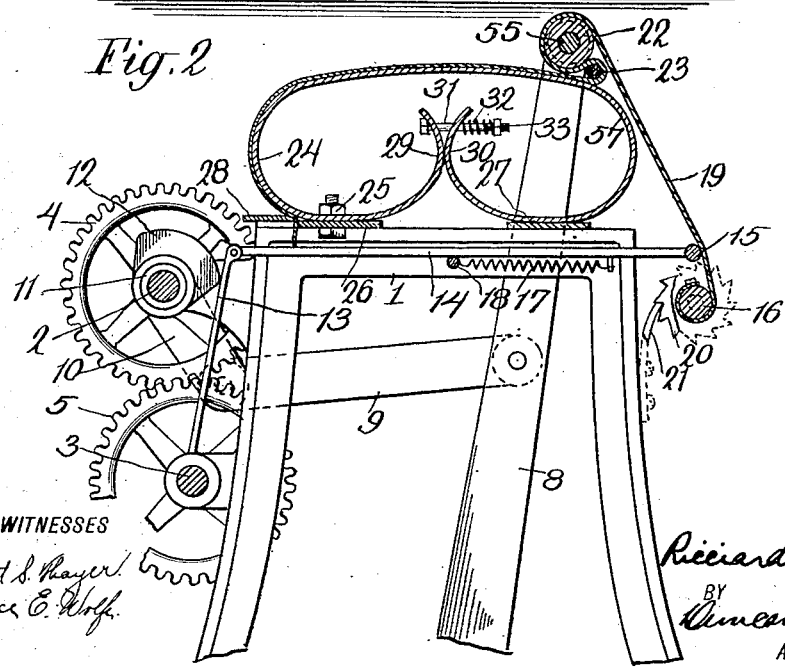

In the accompanying drawings in which the same reference numeral refers to similar parts in the several figures, Figure 1 is an end elevation of an illustrative embodiment of the invention. Fig. 2 is a longitudinal section thereof taken substantially along the line 2—2 of Fig. 1, the parts being shown in slightly different position.

In the illustrative embodiment of this invention shown in the drawings, the heavy side pieces 1 formed of cast iron or other suitable material may be rigidly secured together in any desired way as by the stays 44, cross-bar 25, and support 27 so as to form a rigid frame for the working parts of the machine. The rock-shaft 7 may be mounted in suitable bearings in this frame and carry rigidly secured thereto the arms 8 which may be connected at their upper ends by the pin 55 on which the roll 22 may be revolubly mounted. The links 9 serve to connect the arms 8 and cranks 10 which may be rigidly secured on the crank shaft 2 mounted in suitable bearings in the frame. This shaft may be driven by the pinion 4 meshing with the driving pinion 5 on the drive shaft 3 mounted in the frame and operated in any desired way in connection with a suitable stop mechanism if preferred. This stop mechanism may comprise the driving pulley 6 loosely mounted on the drive shaft 3 adjacent one end thereof and formed with suitable recesses, such as 43. The clutch 53 may be splined on the drive shaft and provided with suitable clutch members 42 to coöperate with the recesses 43 in the pulley, the clutch being engaged by the spring 39 normally tending to force these parts into engagement. The clutch may be formed with a helical or other disengaging groove 40 in its face to coöperate with the catch 41 on the stop lever 38 which when engaging the end of this groove as shown in Fig. 1 prevents further movement of the drive shaft and connected parts. The arm 36 on this stop lever is engaged by a suitable spring 37 normally swinging the catch upward into engagement with the clutch and the stop handle 35 is rigidly connected with the stop shaft 39 so as to swing the lever and catch downward out of engagement with the clutch when desired. Under these circumstances the spring throws the clutch over into engagement with the pulley which thereupon rotates the drive shaft and operates the connecting mechanism so as to swing the arms and roll across the table to form a cigar and then carry the parts back into their charging position. During this time the catch having been forced up into engagement with the groove acts to wedge the clutch out of engagement with the driving pulley so as to stop the further operation of the machine as shown in Fig. 1, the handle being of course released by the operator as soon as it has been momentarily thrown downward to start the machine.

The compensating table may be formed of a resilient table plate 54 of any suitable material, such as a thin sheet steel having an upwardly arching elliptical form as indicated in Fig. 2 and having at the front end the downwardly and inwardly curving retainer member 24 which may be held in position upon the frame in any desired way as by a series of bolts 25, holding the same upon the cross-bar 26. The table plate may also if desired have the integral downwardly and inwardly curving supporting member 57 at its rear end provided with a suitable bearing portion coöperating with the support 27 on which it loosely rests so as to slide thereon during the operation of the machine, the forward movement of this supporting member being resisted by suitable yielding alining means. Suitable aliners may be used for this purpose, such as the inwardly and upwardly curving aliner 30 which may be formed integrally with the table plate and supporting member and may coöperate with a similarly formed integral aliner 29 on the retaining member 24. These two aliners are normally resiliently pressed together and may also be yieldingly held together during the operation of the machine by suitable connecting means, such, for example, as the series of connectors 31 passing through suitable slots in the aliners adjacent their upper free ends and carrying suitable springs 32, whose action in forcing the aliners together may be adjusted by any desired means, such as the nuts 33 coöperating with the threaded ends of the connectors. In this way the initial forward pressure of the bunch upon the rear slope of the supporting member 57 is of course transmitted in both directions through the resilient table plate whose thickness is of course considerably exaggerated in the drawings, thus tending to bow or arch up the working face of the plate and also to force the aliners together so that they have a slight rolling contact with each other as their free ends are forced upward. Suitable adjustment of the connecting members of course regulates the extent to which the working face of the table plate is arched upward during the operation of the machine which is specially desirable with power-operated machines of this character.

It is of course understood that a suitable apron 19 of any desired material, such as canvas, may be mounted to coöperate with the table plate, a suitable fastener such as 28 secured to the frame in any desired way holding the front end of the apron in position by wedging the same under the retainer 24. The apron is looped around the roll 22 to form a pocket and its rear end can be secured to the take-up bar 16 mounted in suitable bearings on the frame and readily adjusted from time to time by the ratchet 20 and coöperating pawl 21. If desired, a suitable tightening mechanism may be provided to increase the tension of the apron at the start of the rolling operation and this may be accomplished by mounting a suitable tightener bar 15 extending across the apron adjacent the take-up bar and supported upon suitable tightener rods 14 passing over the rod 18 in the frame. The other ends of these rods may be pivotally connected with the thin resilient tightener levers 13 which give the tightener a yielding or resilient action. These levers 13 may be loosely mounted on the drive shaft and held in engagement with suitable tightener cams 12 by the springs 17 acting on the rods. The tightener cams are preferably adjustably mounted on the crank shaft by being carried on a suitable cam sleeve 11 which may be held in adjusted position by the set screw 34 so as to adjust the time at which the tightener operates.

After inserting the filler in the apron pocket when the roll has been moved backward to its furthest extent and paste and a suitable wrapper applied to the apron the machine may be operated by moving the handle 35 outward and thereupon the roll is swung forward across the compensating table. The tightener cams 12 come into operation at about this time as indicated in Fig. 2 and throw the tightener rods and connected tightener bar 15 outward against the apron so as to draw the apron taut around the bunch, after the pocket opening has been closed by the movement of the roll 22 over the rear end of the table. As the roll swings forward across the table the filler is rolled and the wrapper applied thereto, forming in this instance a long cylindrical bunch which may have a length of 18 or 20 inches or so so as to form when severed a number of Italian cigars. When a comparatively large amount of filler is placed in the apron pocket the increased diameter of the forming bunch naturally causes an increased pressure against the rear slope of the table plate. This as indicated causes the working face of the table plate to arch up to a greater extent and thus exert a greater resilient pressure against the forming bunch, the resilient aliners preventing the undue forward movement of the supporting member over the support. By adjusting the connectors engaging the alining members the desired degree of resilient pressure may be exerted on the forming bunch which as indicated is to a large extent automatically varied in proportion to the size of the bunch.

Having described this invention in connection with an illustrative embodiment thereof, to the details of which disclosure the invention is not of course to be limited, what is claimed as new and what is desired to be secured by Letters Patent is set forth in the appended claims.

1. In cigar machines, a frame comprising a support, an elliptically arching table plate of thin resilient material having an integral downwardly and inwardly curving retainer member at its forward end secured to said frame and having an inwardly and upwardly curving aliner integral with said retainer member, said table plate having a downwardly and inwardly curving supporting member at its rear end provided with a bearing portion having loose sliding engagement with said support and having an integral inwardly and upwardly curving aliner engaging the aliner on said retainer member, adjustable spring-acting connectors engaging the upper ends of said aliners to adjust their action on each other, a rock-shaft mounted in said frame, arms secured to said shaft and a roll revolubly mounted in said arms to coöperate with said table plate, a rolling apron coöperating with said table plate and roll, a crank shaft mounted in said frame, cranks mounted on said shaft and links connecting said cranks and arms, driving means comprising a stop mechanism to effect a complete oscillation of said arms and roll when desired, a tightener bar, tightener rods connected to said bar, resilient tightener levers pivoted in said frame and adjustable tightener cams mounted on said crank shaft to operate said tightener bar and tighten said apron during the rolling operation.

2. In cigar machines, a frame comprising a support, an upwardly arching table plate of thin resilient material having a downwardly and inwardly curving retainer member at its forward end secured to said frame and having a downwardly and inwardly curving supporting member at its rear end provided with a bearing portion having loose sliding connection with said support and having an inwardly and upwardly curving aliner, a coöperating aliner mounted on said frame, adjustable connecting means engaging said aliners to adjust their action on each other, an oscillating roll coöperating with said table plate, a rolling apron coöperating with said table plate and roll, driving means comprising a stop mechanism to effect a complete oscillation of said roll, a tightener bar and resilient tightener operating means to operate said tightener bar and tighten said apron during the rolling operation.

3. In cigar machines, a support, an upwardly arching table plate of resilient material having a downwardly curving retainer member at its forward end secured to said support and having a downwardly curving supporting member at its rear end having loose engagement with said support and having a resilient aliner connected with said supporting member, a coöperating aliner secured to said support, adjustable spring-acting connecting means engaging said aliners to adjust their action on each other and a moving roll and apron coöperating with said table plate.

4. In cigar machines, a support, an arching table plate of resilient material having its forward end secured to said support and having a downwardly curving supporting member at its rear end having loose engagement with said support and having an aliner connected with said supporting member, alining means mounted on said support and coöperating with said aliner and adjustable connections between said aliner and alining means to adjust their action on each other.

5. In cigar machines, a frame comprising a support, an arching table plate of resilient material having its forward end secured to said support and having a downwardly extending supporting member at its rear end having loose engagement with said support and resilient adjustable alining means resisting the forward movement of said supporting member over said support, an apron coöperating with said table plate and a moving roll coöperating with said table plate and apron and means to operate said roll.

6. In cigar machines, a support, an arching table plate of resilient material having a downwardly curving retainer member at its forward end secured to said support and having a downwardly curving supporting member at its rear end having loose engagement with said support and resilient adjustable alining means resisting the forward movement of said supporting member over said support and a moving roll and apron coöperating with said table plate.

7. In cigar machines, a support, an elliptically arching table plate of thin resilient material having an integral downwardly and inwardly curving retainer member at its forward end secured to said support and an inwardly and upwardly curving aliner, said table plate having a downwardly and inwardly curving supporting member at its rear end provided with a bearing portion having loose engagement with said support and having an inwardly and upwardly curving aliner engaging the aliner on said retainer member and adjustable spring-acting connecting means engaging said aliners to adjust their action on each other.

8. In cigar machines, a support, an arching table plate of resilient material having a downwardly and inwardly curving retainer member at its forward end secured to said support and having a downwardly and inwardly curving supporting member at its rear end having loose engagement with said support and having an upwardly extending aliner connected with said supporting member, an aliner mounted on said support and coöperating with the aliner on said supporting member and adjustable spring-acting connecting means engaging said aliners and adjusting their action on each other.

9. In cigar machines, a support, an arching table plate of resilient material having its forward end secured to said support and having a downwardly and inwardly curving supporting member at its rear end having loose engagement with said support and having an upwardly extending aliner, a coöperating aliner mounted on said support and adjustable connecting means engaging said aliners and adjusting their action on each other.

10. In cigar machines, a support, an upwardly arching table plate of resilient material having a downwardly extending supporting member at its rear end having loose engagement with said support and adjustable yielding alining means resisting the forward movement of said supporting member upon said support.

11. In cigar machines, a rolling table, an apron and roll coöperating with said rolling table, a tightener bar to engage said apron and tighten the same during the first of the rolling operation, resilient connections to operate said tightener and a cam adjustable with respect to said rolling apron to actuate said connections.

12. In cigar machines, a support, an upwardly arching table plate of resilient material having a downwardly extending supporting member at its rear end, an apron coöperating with said table plate and apron, a tightener and means to yieldingly force said tightener into contact with said apron at the beginning of the rolling operation to tighten the same.

RICCIARDO ANNIGONI.

Witnesses:
HARRY L. DUNCAN,
JESSIE B. KAY.